US012651740B2

(12) United States Patent
Deng et al.

(10) Patent No.: US 12,651,740 B2
(45) Date of Patent: Jun. 9, 2026

(54) CHARGED-STATE LITHIUM-ION BATTERIES CONSTRUCTED USING LITHIUM-FREE BINARY FE/MN-BASED CATHODE MATERIALS

(71) Applicant: Wayne State University, Detroit, MI (US)

(72) Inventors: Da Deng, Troy, MI (US); Venkata Rohit Punyapu, Dexter, MI (US)

(73) Assignee: Wayne State University, Detroit, MI (US)

( * ) Notice: Subject to any disclaimer, the term of this patent is extended or adjusted under 35 U.S.C. 154(b) by 823 days.

(21) Appl. No.: 17/909,508

(22) PCT Filed: Mar. 5, 2021

(86) PCT No.: PCT/US2021/021108
§ 371 (c)(1),
(2) Date: Sep. 6, 2022

(87) PCT Pub. No.: WO2021/178813
PCT Pub. Date: Sep. 10, 2021

(65) Prior Publication Data
US 2023/0343928 A1     Oct. 26, 2023

Related U.S. Application Data

(60) Provisional application No. 62/986,079, filed on Mar. 6, 2020.

(51) Int. Cl.
*H01M 4/1315* (2010.01)
*H01M 4/13915* (2010.01)
(Continued)

(52) U.S. Cl.
CPC ......... *H01M 4/364* (2013.01); *H01M 4/1315* (2013.01); *H01M 4/13915* (2013.01);
(Continued)

(58) Field of Classification Search
CPC ............... H01M 4/364; H01M 4/1315; H01M 4/13915; H01M 4/366; H01M 4/382;
(Continued)

(56) References Cited

U.S. PATENT DOCUMENTS

| | | | |
|---|---|---|---|
| 2006/0078797 A1 | 4/2006 | Munshi | |
| 2014/0170493 A1* | 6/2014 | Holme ................... | H01M 4/624 |
| | | | 429/231.95 |

(Continued)

FOREIGN PATENT DOCUMENTS

| | | | | |
|---|---|---|---|---|
| CN | 106207138 A | * 12/2016 | ............ | H01M 4/362 |
| CN | 108417793 A | * 8/2018 | ............ | H01M 4/131 |

OTHER PUBLICATIONS

Zhengzheng Li, Li, MnO2-graphene nanosheets wrapped mesoporous carbon/sulfur composite for lithium sulfur batteries, Royal Society Open Science, vol. 5, 2018, pp. 1-7 (Year: 2018).*

(Continued)

*Primary Examiner* — Matthew T Martin
*Assistant Examiner* — Kevin Song
(74) *Attorney, Agent, or Firm* — Fishman Stewart PLLC

(57) ABSTRACT

A lithium-ion battery may include a lithium-free cathode, a lithiated anode, and a separator/electrolyte between the lithium-free cathode and the lithiated anode. The lithium-free cathode may include FeOF and $MnO_2$. The FeOF may be in the form of nanorods, and the $MnO_2$ may be in the form of monolayer nanosheets. The FeOF nanorods may be sandwiched or wrapped by the monolayer $MnO_2$ nanosheets.

20 Claims, 3 Drawing Sheets

10

12 — Lithium-free cathode ($FeOF/MnO_2$)

14 — Separator/electrolyte

16 — Lithiated anode ($Li$, $Li_xSi$, $Li_yC$, $Li_zM$)

(51) Int. Cl.

| | |
|---|---|
| *H01M 4/36* | (2006.01) |
| *H01M 4/38* | (2006.01) |
| *H01M 4/50* | (2010.01) |
| *H01M 4/52* | (2010.01) |
| *H01M 10/0525* | (2010.01) |
| *H01M 10/0585* | (2010.01) |
| *H01M 4/02* | (2006.01) |

(52) U.S. Cl.

CPC ........... *H01M 4/366* (2013.01); *H01M 4/382* (2013.01); *H01M 4/502* (2013.01); *H01M 4/523* (2013.01); *H01M 10/0525* (2013.01); *H01M 10/0585* (2013.01); *H01M 2004/027* (2013.01); *H01M 2004/028* (2013.01)

(58) Field of Classification Search

CPC .. H01M 4/502; H01M 4/523; H01M 10/0525; H01M 10/0585; H01M 2004/027; H01M 2004/028; H01M 4/582; Y02E 60/10

See application file for complete search history.

(56) References Cited

U.S. PATENT DOCUMENTS

| | | | |
|---|---|---|---|
| 2017/0030975 A1* | 2/2017 | Ueno | G01R 31/392 |
| 2019/0267615 A1* | 8/2019 | Xie | H01M 4/483 |

OTHER PUBLICATIONS

CN-106207138-A Translate (Year: 2016).*

CN-108417793-A Translate (Year: 2018).*

Zhengzheng Li, "MnO2-graphene nanosheets wrapped mesoporous carbon/sulfur composite for lithium-sulfur batteries," Royal Society open science, vol. 5,2 171824. Feb. 7, 2018, doi:10.1098/rsos.171824.

Fan, Xiulin et al. "PEDOT Encapsulated FeOF Nanorod Cathodes for High Energy Lithium-Ion Batteries." Nano letters, vol. 15, iss. 11 (2015), pp. 7650-7656.

Zhu, Jian et al., "Wet-chemical synthesis of phase-pure FeOF nanorods as high-capacity cathodes for sodium-ion batteries." Angewandte Chemie (International ed. in English) vol. 54, iss. 10 (2015), pp. 3079-3083.

Wang, L. et al., "Iron oxyfluorides as lithium-free cathode materials for solid-state Li metal batteries," Journal of Materials Chemistry A, vol. 5, iss. 35 (2017), pp. 18464-18468.

Deng, "Transition Metal Oxyfluorides for Next-Generation Rechargeable Batteries", ChemNanoMat 2017, vol. 3, pp. 146-159.

Deng, Shuo et al., "Two-Dimensional MnO 2 as a Better Cathode Material for Lithium Ion Batteries," The Journal of Physical Chemistry C., vol. 119, iss. 52, Dec. 31, 2015, pp. 28783-28788.

International Search Report dated May 20, 2021 for copending International App. No. PCT/US2021/021108.

* cited by examiner

*10*

*12* — Lithium-free cathode
($FeOF/MnO_2$)

*14* — Separator/electrolyte

*16* — Lithiated anode
($Li$, $Li_xSi$, $Li_yC$, $Li_zM$)

*12*

*18*

*20*

FeOF nanorod
$MnO_2$ nanosheet 100 nm 100 nm

1 µm 100 nm

CHARGED-STATE LITHIUM-ION BATTERIES CONSTRUCTED USING LITHIUM-FREE BINARY FE/MN-BASED CATHODE MATERIALS

CROSS-REFERENCE TO RELATED APPLICATIONS

This application is a national phase application of and claims priority to International Patent Application No. PCT/US2021/021108, filed on Mar. 5, 2021, which claims priority to U.S. Provisional Patent Application No. 62/986,079, filed on Mar. 6, 2020, the contents of each of which are hereby incorporated by reference in their entirety

GOVERNMENT LICENSE RIGHTS

This invention was made with government support under contract no. DE-EE0008236 awarded by the Department of Energy. The government has certain rights in the invention.

TECHNICAL FIELD

This disclosure relates generally to lithium battery technology, including a lithium-free binary Fe/Mn-based cathode material, lithium batteries assembled in charged state.

BACKGROUND

Next-generation lithium-ion batteries (LIBs) have to be developed in order to meet the increasing energy storage demands for many important energy-storage applications, including personal electronic devices, electric vehicles, and girds of sustainable energy. Next-generation lithium batteries should have high energy, high power, enhanced safety, good thermal and mechanical stability, and improved cyclability. It is known that performances of LIBs are determined by many components, particularly, the electrode materials. Therefore, it is crucially important to achieve breakthroughs in the search for alternative electrode materials for next-generation LIBs.

The existing commercial cathode material of lithium cobalt oxide ($LiCoO_2$) has known issues of poor thermal and mechanical stability. In order to avoid charges in the layered structures of $LiCoO_2$, only half of its theoretical capacity could be practically utilized (~140 mAh/g). Additionally, the decomposition of $LiCoO_2$ reactions can cause fire. Another issue of $LiCoO_2$ is the presence of toxic and expensive element Co. The shortage of Co to meet the five-fold increase in demands recently makes Co one of the most expensive elements besides previous metals. Therefore, may efforts are focused on the development of alternative layered cathode materials where Co is replaced or partially replaced.

For example, $LiNi_{1-x-y}Mn_xCo_yO_2$ (NMC) and $LiNi_{1-x-y}Co_xAl_yO_2$ (NCA) cathode materials have demonstrated highly improved performances. The partial replacement of Co with Ni, Mn, Al in cathode materials have been successfully commercialized. However, Co is still present.

Next-generation Co-free cathode materials need to be developed. One candidate to replace Co is Mn, which is not only abundant but also environmentally benign. Recently, computational work has pointed out that two-dimensional (2-D) monolayer $MnO_2$ sheets, which have a high theoretical capacity of 616 mAh/g as well high lithium adsorption energy (4.37 eV) and low lithium diffusion barrier (0.148 eV), in contrast to that of bulk $MnO_2$, are promising high-energy and high-power cathode materials for next-generation LIBs. Unfortunately, monolayer $MnO_2$ sheets suffer the issues of restacking and poor stability.

Another promising cathode material is Fe for its abundance and low cost. Fe-based $LiFePO_4$ has been successfully commercialized, but its capacity is moderate. Another Fe-based candidate FeOF with polar covalent Fe—O bonds in ionic fluoride structure is proposed as high capacity cathode materials. FeOF has an impressively high theoretical capacity of 885 mAh/g. However, it was a challenging task to synthesize battery-grade FeOF. Our group developed a wet-chemical approach to prepare pure FeOF recently. The as-prepared FeOF demonstrated promising performance as cathodes for both sodium- and lithium-ion batteries.

Thus, there is a need to develop improved lithium-ion batteries that address the aforementioned challenges or shortcomings.

DETAILED DESCRIPTION

Figure 1:
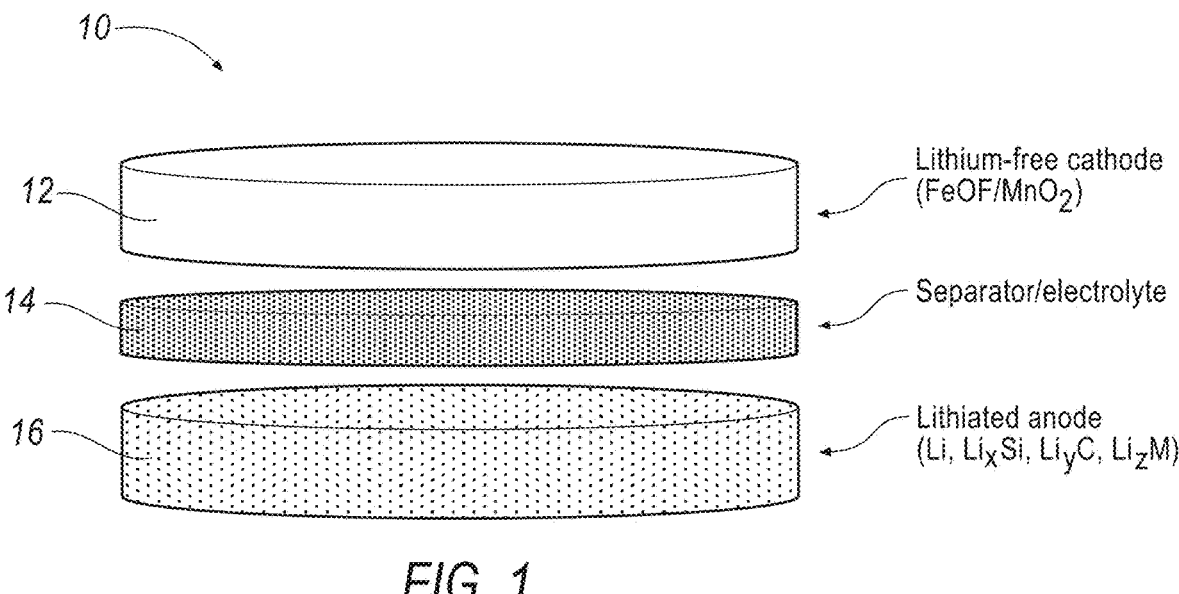
FIG. 1 is a schematic illustration of a lithium-ion battery.

Referring now to the figures, FIG. 1 is a schematic illustration of a lithium-ion battery (LIB) 10. The LIB 10 may include a first layer of a lithium-free cathode 12, a second separator/electrolyte layer 14, and a third layer of a lithiated/lithium anode 16. The second separator layer 14 generally may separate the lithium-free cathode first layer 12 and the lithiated anode third layer 16 and facilitate Li ion transfer. The lithium-free cathode 12 generally may be a composite cathode including $MnO_2$ and FeOF. In embodiments, the $MnO_2$ may be in the form of monolayer nanosheets, and the FeOF may be in the form of nanorods. The FeOF nanorods could be sandwiched or wrapped by the monolayer $MnO_2$ nanosheets. The second separator layer 14 may be an electrolyte layer. The lithiated anode may include one or more of Li, $Li_xSi$, $Li_yC$, and $Li_zM$ (Note: Li=lithium, Si=silicon, C=carbon, M=metals).

The $MnO_2$ and FeOF are lithium-free cathode materials and generally cannot be coupled with lithium-free anodes (e.g., graphite or silicon), in contrast to that in existing lithium-ion batteries. All commercial LIBs use cathode materials as the reservoir for lithium and lithium-free carbon and/or silicon as anodes. Commercial LIBs are always assembled in discharged state. In contrast, lithium-free $MnO_2$ or FeOF can be coupled with lithium metal anodes to make LIBs that are assembled in fully charged state. Beside lithium metal, lithiated silicon anodes, lithiated carbon or lithium metal alloys can also be employed. By using the lithium-free cathodes, the as-assembled LIBs will be tolerant to overcharge, therefore achieving improved safety, in contrast to existing LIBs using cathodes as the lithium sources.

The presence of FeOF nanoparticles could prevent the restacking of the monolayer $MnO_2$ nanosheets. In other words, the instinct electrochemical properties of monolayer $MnO_2$ could be preserved. At the same time, the presence of monolayer $MnO_2$ nanosheets could enhance the electrical integration of the FeOF nanorods. Synergistic effects can lead to novel Fe/Mn-based lithium-free cathode materials with both high voltage and high capacity. As a result, the structured composite can facilitate the reversible storage of lithium.

Experimental Section

Materials synthesis: All chemicals were used as received. (1) FeOF nanorods were synthesized based on a wet-chemical method. Typically, 66.8 mg of $FeF_3 \cdot 3H_2O$ was added to 32 mL of 1-Propanol in a 45 mL Teflon chamber. The mixture was sonicated for 10 min and heated to 200° C. for 24 h in an autoclave. The as-synthesized FeOF nanorods were collected and thoroughly washed with deionized water and ethanol and then dried in a vacuum oven for 12 h at 120° C. (2) Single layer δ-$MnO_2$ nanosheets were synthesized based a modified method. Typically, 0.1 M sodium dodecyl sulfate solution (64 ml) and 0.1 M sulfuric acid of (32 ml) were added into a 500 mL round bottom flask containing 283 mL of DI water and heated to 95° C. $KMnO_4$ solution (0.05M, 6.4 mL) was rapidly added to flask and the mixture was heated for 60 min. A dark homogenous solution was observed and the reactor was immediately quenched in ice-cold water until it reached room temperature. The as-synthesized monolayer $MnO_2$ sheets were then similarly collected and thoroughly washed by water and ethanol. (3) The FeOF@$MnO_2$ composites were then synthesized. Typically, the FeOF nanorods were dispersed in 10 mL of water by alternative sonication and vortex mixing for 30 min. A 10 mL of monolayer δ-$MnO_2$ sheets dispersed in solution was mixed into the FeOF solution. This mixture was sonicated for 10 min before being transferred into a beaker. The mixture was heated at 35° C. for 24 h along with continuous stirring. The dried sample was collected, and vacuum dried at 120° C. for 24 h.

Material Characterization: Powder X-ray diffraction (XRD) of the samples was carried out in a Rigaku D-MAX/B X-ray powder diffractometer using Cu Kα radiation. The morphologies of the products were characterized by a field emission/scanning electron microscopy (JSM-7600 FESEM, equipped with X-ray energy-dispersive spectrometer (EDS)), by a transmission electron microscopy (JEOL 2010 TEM with accelerating voltage of 200 kV), and by a Shimadzu UV-2600 UV-Vis Spectrophotometer.

Electrochemical Measurements: Electrochemical performances of the as-prepared composite of FeOF@$MnO_2$ nanorods@nanosheets as lithium-free cathode were preliminarily evaluated. Typically, composite FeOF@$MnO_2$ nanostructure was investigated using CR2032 coin cells. 80 wt % active materials, 10 wt. % Super P Carbon and 10 wt. % polyvinylidene binder (PVDF) were mixed in an N-methyle-2-pyrrolidone solvent to form a slurry. The slurry was pasted on Al foil and dried in a vacuum oven for 12 h at 120° C. Celgard microporous membrane was used as the separator. IM $LiPF_6$ in ethylene carbonate (EC)/diethyl carbonate (DEC) (v/v=1:1) solution was used as electrolyte. The coin cells were assembled in an argon-filled glove box. The assembled cells were tested on a Neware Battery Testing system.

Results and Discussion

Figure 2:
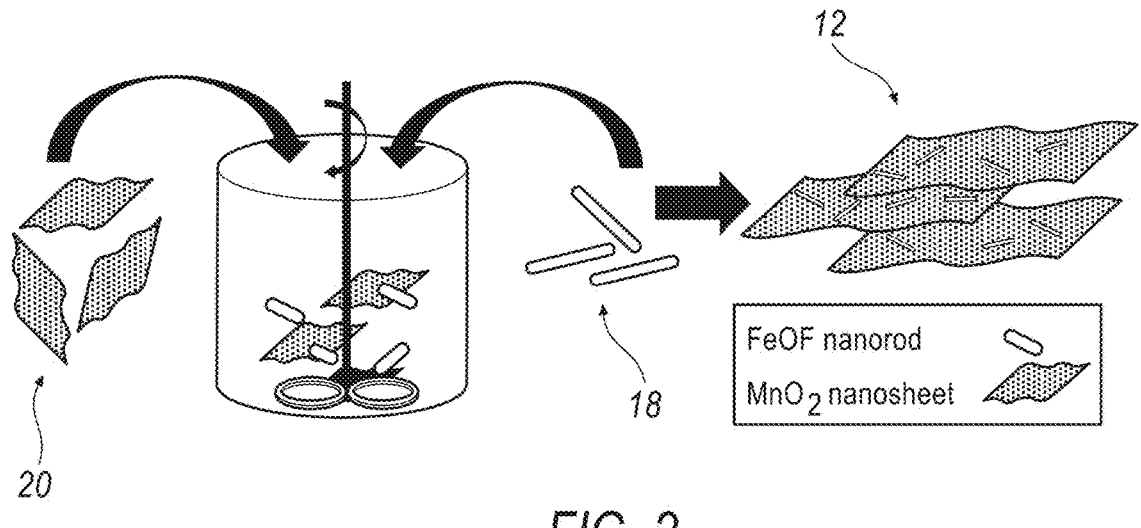
FIG. 2 is a schematic illustration of the preparation of an FeOF@MnO_2 composite.

As generally illustrated in FIG. 2, the combination of 1-D FeOF nanorods 18 and 2-D $MnO_2$ nanosheets 20 may facilitate the formation of a sandwich-like structure. Here, FeOF nanorods 18 may be inserted between $MnO_2$ nanosheets 20 in order to prevent the restacking of $MnO_2$ nanosheets. It is known that restacking of $MnO_2$ nanosheets can lead to the formation of bulk $MnO_2$ with distinct properties from monolayer $MnO_2$. Bulk $MnO_2$ can be used as anode materials for LIBs, but not cathodes. In contrast, monolayer $MnO_2$ is calculated to exhibit high capacity of 616 mAh/g as cathode materials for LIBs. $MnO_2$ nanosheets can be well dispersed in solution with a typical absorption peak ~374 nm. The characteristic absorption peak ~374 nm may be assigned to monolayer $MnO_2$ with thickness of 0.95 nm. The monolayer $MnO_2$ nanosheets with extremely large exposed surface area can facilitate the aggregation of FeOF nanorods on the surface of nanosheets in order to minimize total energy. At the same time, well dispersed nanorods and nanosheets under continuous stirring can ensure uniform distribution of the two leading the formation of structured FeOF@$MnO_2$ composite.

Figure 3A:
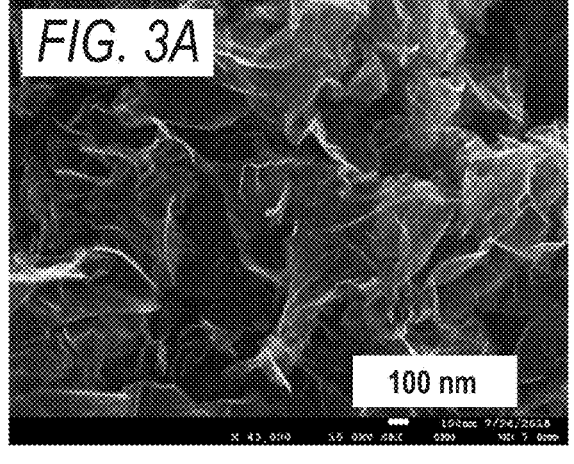
FIG. 3A is an FESEM image of 2-D monolayer $MnO_2$ nanosheets.
Figure 3B:
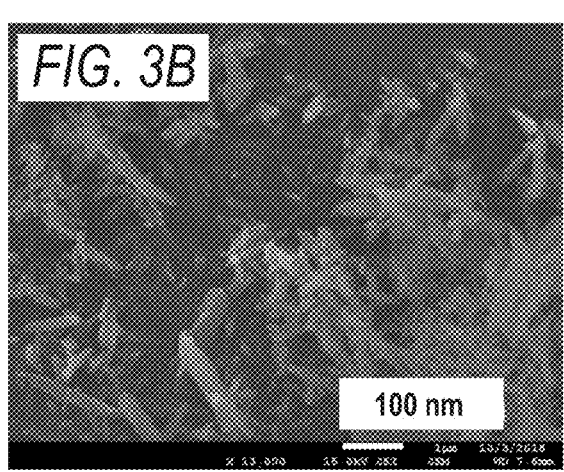
FIG. 3B is an FESEM image of 1-D FeOF nanorods.
Figure 3C:
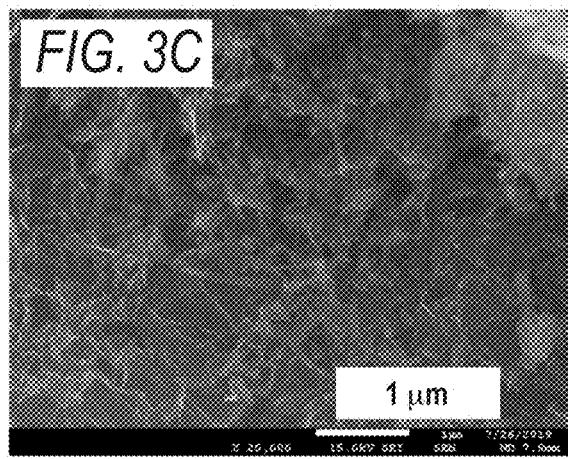
FIGS. 3C and 3D are FESEM images of an FeOF@MnO_2 composite at a low-magnification view and a high-magnification view, respectively.
Figure 3D:
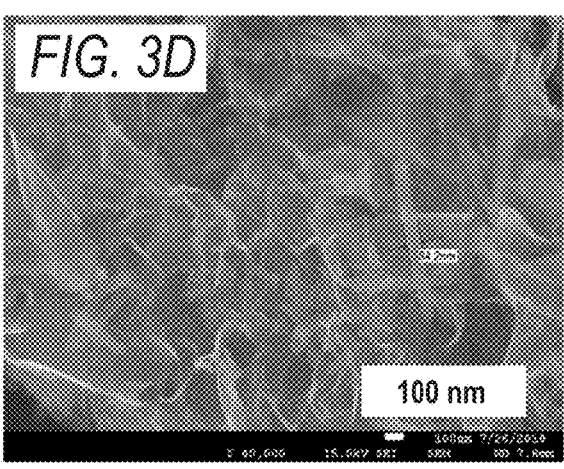

The successful preparation of FeOF@$MnO_2$ composite was revealed by Field Emission Scanning Electron Microscope (FESEM) characterization, as illustrated in FIGS. 3A-3D. As compared to precursor $MnO_2$ nanosheets (FIG. 3A), the characteristic wrinkled and folded morphology of monolayer $MnO_2$ nanosheet was well preserved in the product of FeOF@$MnO_2$ composite (FIG. 3D). As compared to precursor FeOF nanorods (FIG. 3B), the rod-like morphology was observed though the composite (FIG. 3C). FESEM characterization evidenced that the restacking of $MnO_2$ nanosheets to form bulk $MnO_2$ was successfully prevented in the presence of FeOF nanorods. The even distribution of FeOF nanorods in $MnO_2$ nanosheets was revealed by observed light contrast of nanorods surrounded and wrapped by wrinkled sheets as revealed by the FESEM images (FIGS. 3C and 3D). Although the sizes of nanorods are not uniform, they were wrapped and covered by 2-D $MnO_2$ nanosheets which prevent their aggregation. A large FeOF nanorod with width of 84 nm covered with flexible light contrast monolayer $MnO_2$ nanosheet is highlighted in FIG. 3D. Even distribution of FeOF nanorods in $MnO_2$ nanosheets was also evidenced by elemental mapping analysis. EDS analysis show the atomic ration of Fe:Mn at 25:11.

Figure 4A:
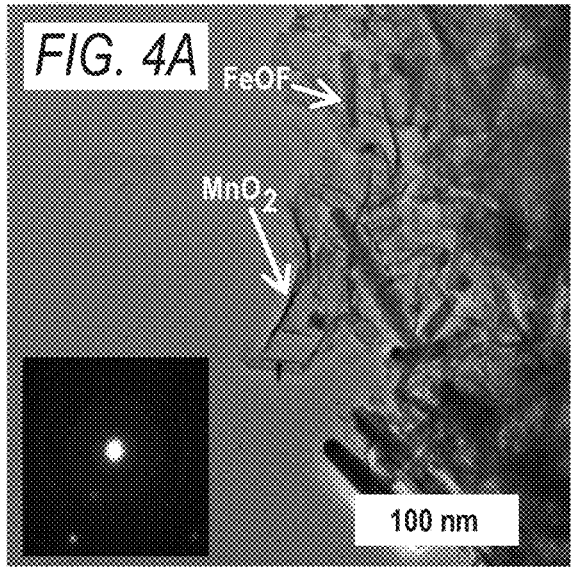
FIGS. 4A and 4B are TEM images of an FeOF@MnO_2 composite at a low-magnification view and a high-magnification view, respectively.
Figure 4B:
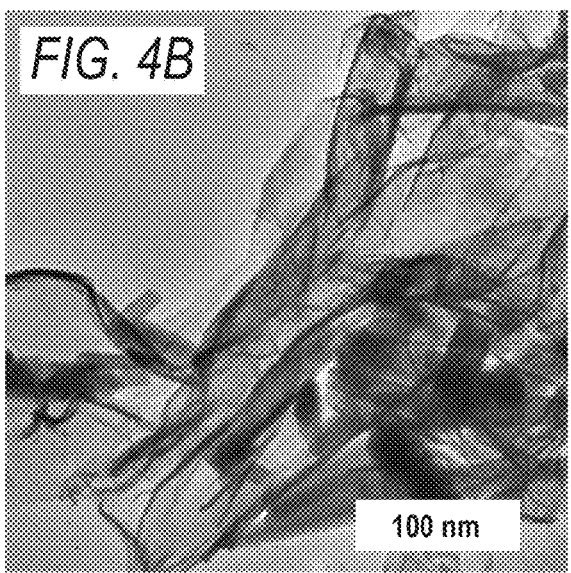

The FeOF@$MnO_2$ composite was further characterized by transmission electron microscopy (TEM), as illustrated in FIGS. 4A and 4B. The FeOF rods have length of few hundreds nanometers and width of few tens nanometers. The width of FeOF nanorods is much larger than the thickness of $MnO_2$ nanosheet at ~1 nm. Therefore, under TEM observation, the contrast of FeOF nanorods is darker than those $MnO_2$ nanosheets which help to easily distinguish them. It should be noted that the wrinkles of folded $MnO_2$ nanosheets also showed dark contrast but narrower and darker as compared to that of FeOF nanorods (as seen in FIG. 4A). The formation of wrinkles instead of aggregated bulk $MnO_2$ layers in the presence of FeOF nanorods suggests that FeOF nanorods functioned as pillars inserted between those monolayer $MnO_2$ nanosheets (FIG. 4B). The FeOF@$MnO_2$ composite can offer electrical integration and advantages of both 1-D and 2-D materials. In other words, the composite offers open structures exposed to liquid electrolyte and can facilitate the reversible storage of lithium.

Figure 5A:
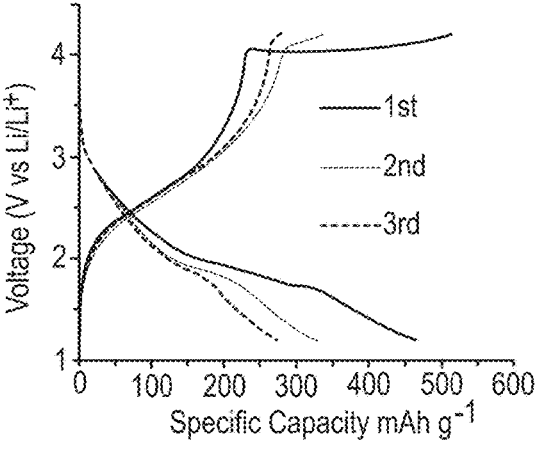
FIG. 5A is a graph illustrating a charge-discharge profile of the first three cycles for of a lithium-ion battery with an FeOF@MnO2 composite.
Figure 5B:
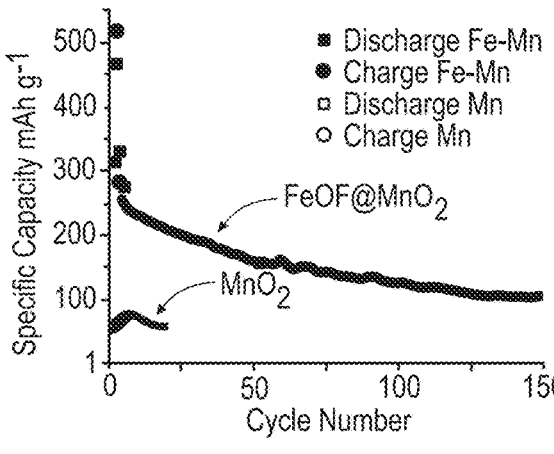
FIG. 5B is a graph illustrating cycling and rate performance of a lithium-ion battery with an FeOF@MnO2 composite and with MnO2.

As generally illustrated in FIGS. 5A and 5B, electrochemical performance of the as-prepared FeOF@$MnO_2$ composite as cathodes in lithium-ion batteries was evaluated. For the purposes of this analysis, lithium metal was used as an anode in order to simplify the electrochemical analysis. The first three cycles of the charge-discharge profile are illustrated in FIG. 5A. Test conditions used were currents of 100 mA/g and a voltage window of 1.2-4.2 V. The open-circuit voltage is about 3.2V. It is known that electrodes based on monolayer $MnO_2$ nanosheets exfoliated from layered $MnO_2$ have open-circuit voltage about 3.5V. Electrodes based on FeOF synthesized by the roll-quenching method have open-circuit voltage about 3.2V. The open-circuit voltage of composite electrodes is in the range determined by chemical potential of the active materials. In the first discharge (lithiation) slope, the small plateau around 3V should be assigned to the redox reaction of $Mn^{3+}/Mn^{4+}$ couple. The plateau around 2V to 1.6V should be assigned to the insertion of Li ions into FeOF. The slop/plateau approximately 1.0 V could be attributed to the partial formation of LiF, $Li_2O$, and metallic Fe similar to those observed in sodium ion batteries. The first cycle discharge delivered a capacity of 468 mAh/g (as seen in FIG. 5A). This number is smaller than that of theoretical values for monolayer $MnO_2$ nanosheets at 616 mAh/g or FeOF at 885 mAh/g. This indicated no full lithiation was achieved in first cycle discharge. Although the not optimized capacity is significantly higher than standard cathode of $LiCoO_2$ at 140 mAh/g, further process optimization is needed to increase the degree of lithiation. It should be noted that the testing current of 100 mA/g is moderately high for the evaluation of cathode materials which might affect the full utilization of active materials.

First cycle charge delivered a capacity of 540 mAh/g (as seen in FIG. 5A). The observed differences in first cycle charge and discharge capacity for cathode materials may be attributed accidental partial discharge in cell assembly process before testing as the cells were assembled in charged state. In other words, first cycle discharge capacity was not fully recorded by the battery testers. The partial discharge before testing was also evidenced by the relatively smaller open circuit voltage of 3.2 V measured than estimated based on chemical potentials. Another possible cause may be that electrochemical parasitic reactions associated with electrolyte decompositions and corrosion of aluminum current collector and even the stainless steel case under high voltage conditions. The plateau around 4V could be associated with those parasitic reactions (as seen in FIG. 5A). The reduction in 4V plateau capacities from $1^{st}$, $2^{nd}$ to $3^{rd}$ suggested that those parasitic reactions reduced dramatically. The parasitic reactions were decremented due to the formation of stable liquid-solid interfaces/interphases.

As compared to control electrodes of monolayer $MnO_2$ nanosheets, the composite FeOF@$MnO_2$ electrode demonstrated higher capacity and better cyclability than that of control of monolayer $MnO_2$ nanosheets (as seen in FIG. 5B). From $3^{rd}$ cycle onward, the FeOF@$MnO_2$ cathodes demonstrated reasonable capacity retention and stability. The cathode can be cycled for at least 150 times with a capacity comparable to standard cathode of $LiCoO_2$ cathodes.

Further, rate performance was tested. The specific capacity can be maintained at above 150 mAh/g at rate of 100 mA/g for 40 cycles. When the testing current was doubled to 200 mA/g, capacity dropped moderately. The result suggests that this cathode have potential for high rate batteries.

When introducing elements of various embodiments of the disclosed materials, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

While the preceding discussion is generally provided in the context of medical imaging, it should be appreciated that the present techniques are not limited to such medical contexts. The provision of examples and explanations in such a medical context is to facilitate explanation by providing instances of implementations and applications. The disclosed approaches may also be utilized in other contexts, such as the non-destructive inspection of manufactured parts or goods (i.e., quality control or quality review applications), and/or the non-invasive inspection or imaging techniques.

While the disclosed materials have been described in detail in connection with only a limited number of embodiments, it should be readily understood that the embodiments are not limited to such disclosed embodiments. Rather, that disclosed can be modified to incorporate any number of variations, alterations, substitutions or equivalent arrangements not heretofore described, but which are commensurate with the spirit and scope of the disclosed materials. Additionally, while various embodiments have been described, it is to be understood that disclosed aspects may include only some of the described embodiments. Accordingly, that disclosed is not to be seen as limited by the foregoing description, but is only limited by the scope of the appended claims.

What is claimed is:

1. A method, comprising:
synthesizing FeOF nanorods;
synthesizing monolayer $MnO_2$ nanosheets;
synthesizing a composite from the synthesized FeOF nanorods and the synthesized monolayer $MnO_2$ nanosheets;
wherein synthesizing the composite includes:
dispersing the synthesized FeOF nanorods in water to form an FeOF solution;
dispersing the synthesized monolayer $MnO_2$ nanosheets in water to form an $MnO_2$ solution;
forming an $MnO_2$—FeOF mixture by mixing the $MnO_2$ solution into the FeOF solution;
sonicating the $MnO_2$—FeOF mixture; and
heating the $MnO_2$—FeOF mixture.

2. The method of claim 1, wherein
dispersing the synthesized FeOF nanorods in water includes alternating sonication and vortex mixing for a predetermined duration.

3. The method of claim 1, further comprising at least one of:
washing the FeOF nanorods with deionized water and ethanol, and drying the washed FeOF nanorods in a vacuum; and
washing the monolayer $MnO_2$ nanosheets with water and ethanol.

4. The method of claim 3, further comprising:
collecting a dried sample; and
vacuum drying the sample.

5. The method of claim 1, wherein the composite is in the form of a cathode.

6. The method of claim 5, further comprising assembling the cathode with a lithiated anode and a separator between a lithium-free cathode and the lithiated anode to assemble a lithium-ion battery.

7. The method of claim 6, wherein the separator is an electrolyte.

8. The method of claim 6, wherein the lithiated anode includes at least one of Li, $Li_xSi$, $Li_yC$, and $Li_zM$.

9. The method of claim 6, wherein the lithium-ion battery is assembled in a fully charged state.

10. The method of claim 1, wherein synthesizing FeOF nanorods includes adding $FeF_3$ and $H_2O$ to propanol to form a mixture, then sonicating and heating the mixture each for a predetermined duration.

11. The method of claim 1, wherein synthesizing monolayer $MnO_2$ nanosheets includes:

adding $KMnO_4$ to a solution containing sodium dodecyl sulfate, sulfuric acid, and water to form a mixture;

heating the mixture for a predetermined time; and quenching the mixture until room temperature is reached.

12. The method of claim 1, wherein heating the $MnO_2$—FeOF mixture includes continuous stirring during the heating.

13. The method of claim 1, wherein heating the $MnO_2$—FeOF mixture is performed at 35° C. for a predetermined duration.

14. A method, comprising:

synthesizing FeOF nanorods by adding $FeF_3$ and $H_2O$ to propanol to form a mixture, sonicating the mixture and heating the mixture each for a predetermined duration;

synthesizing monolayer $MnO_2$ nanosheets;

synthesizing a composite from the synthesized FeOF nanorods and the synthesized monolayer $MnO_2$ nanosheets.

15. The method of claim 14, wherein synthesizing the composite includes:

dispersing the synthesized FeOF nanorods in water to form an FeOF solution;

dispersing the synthesized monolayer $MnO_2$ nanosheets in water to form an $MnO_2$ solution;

forming an $MnO_2$—FeOF mixture by mixing the $MnO_2$ solution into the FeOF solution;

sonicating the $MnO_2$—FeOF mixture; and heating the $MnO_2$—FeOF mixture.

16. The method of claim 15, wherein dispersing the synthesized FeOF nanorods in water includes alternating sonication and vortex mixing for a predetermined duration.

17. The method of claim 15, wherein heating the $MnO_2$—FeOF mixture includes continuous stirring during the heating.

18. The method of claim 14, wherein synthesizing the FeOF nanorods further includes washing the FeOF nanorods with deionized water and ethanol, and drying the washed FeOF nanorods in a vacuum.

19. The method of claim 14, wherein the mixture is heated to 200° C. for 24 hours.

20. The method of claim 14, wherein synthesizing monolayer $MnO_2$ nanosheets includes:

heating a solution containing sodium dodecyl sulfate, sulfuric acid, and water to predetermined temperature;

adding $KMnO_4$ to the solution to form a mixture;

heating the mixture for a predetermined time; and quenching the mixture until room temperature is reached.

* * * * *